J. S. TAYLOR.
COMBINED MANIFOLD AND ROTARY DISTRIBUTING VALVE FOR INTERNAL COMBUSTION ENGINES.
APPLICATION FILED APR. 24, 1913. RENEWED AUG. 27, 1919.
1,378,431.
Patented May 17, 1921.
3 SHEETS—SHEET 1.
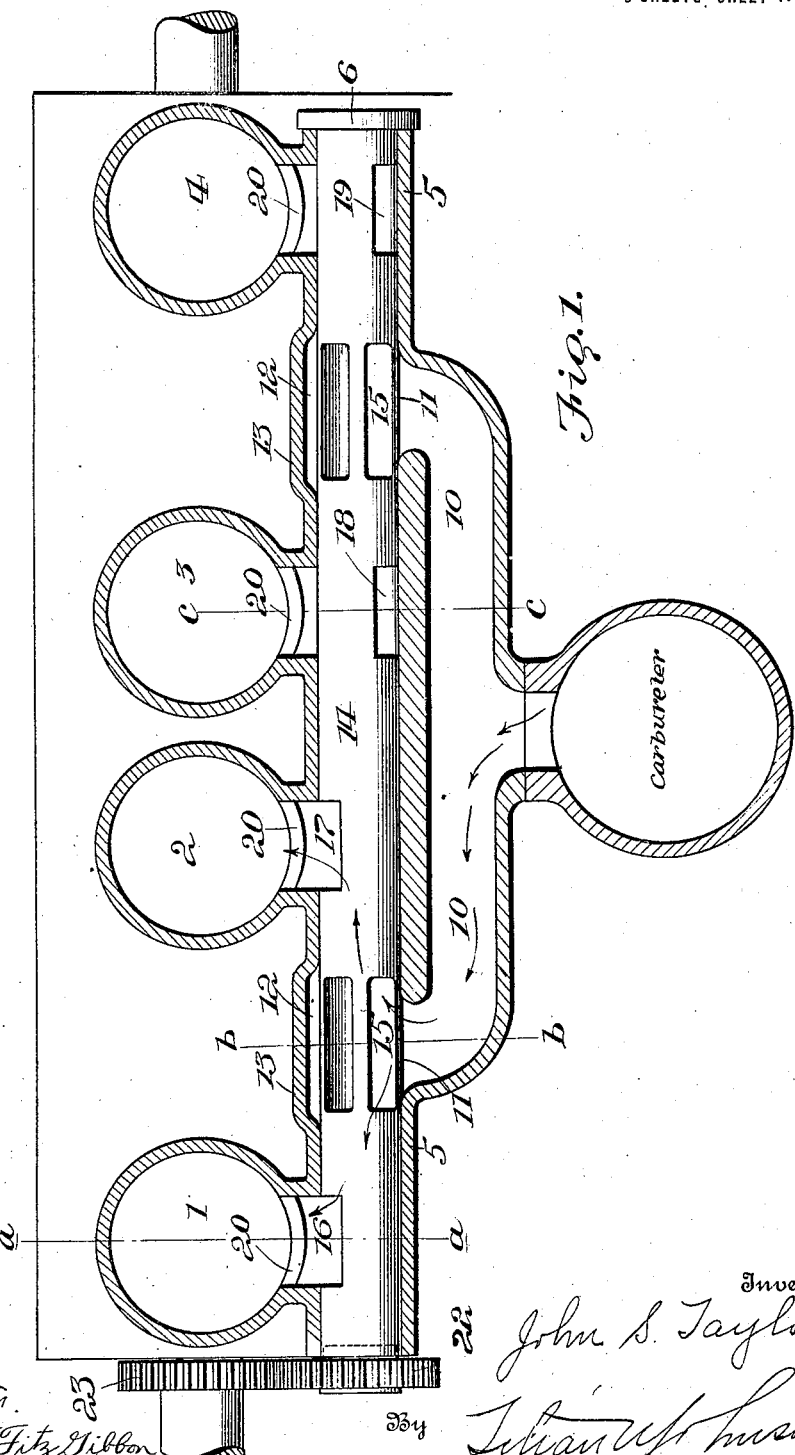

J. S. TAYLOR.
COMBINED MANIFOLD AND ROTARY DISTRIBUTING VALVE FOR INTERNAL COMBUSTION ENGINES.
APPLICATION FILED APR. 24, 1913. RENEWED AUG. 27, 1919.
1,378,431.
Patented May 17, 1921.
3 SHEETS—SHEET 2.
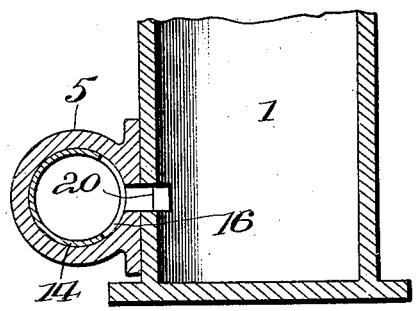
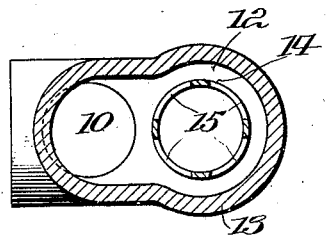
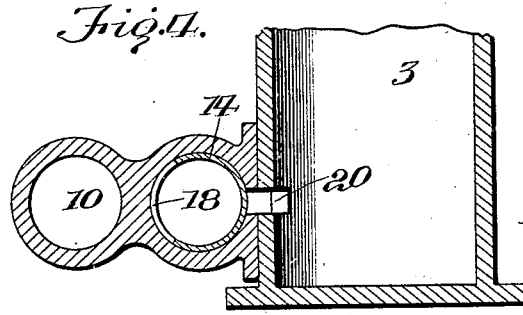
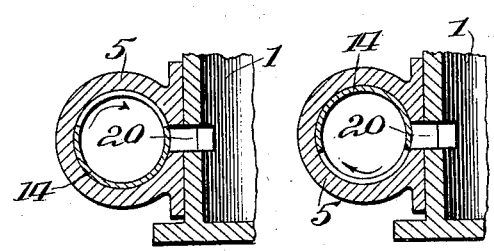
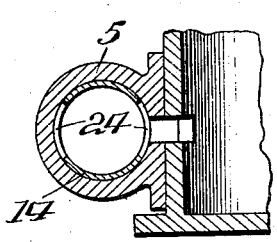
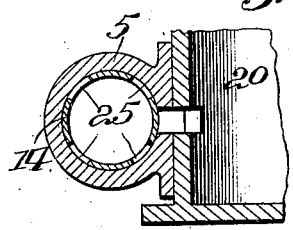

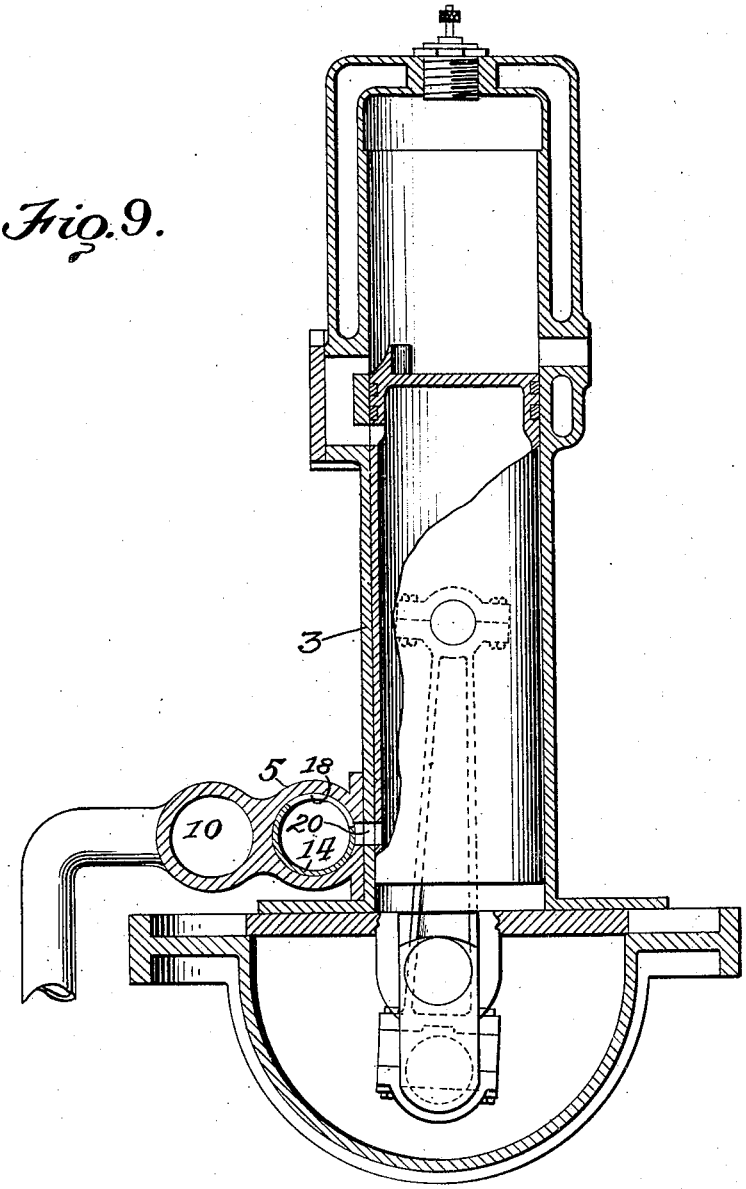

UNITED STATES PATENT OFFICE.

JOHN S. TAYLOR, OF NORFOLK, VIRGINIA, ASSIGNOR, BY MESNE ASSIGNMENTS, TO PREMIER MOTOR CORPORATION OF AMERICA, A CORPORATION OF DELAWARE.

COMBINED MANIFOLD AND ROTARY DISTRIBUTING-VALVE FOR INTERNAL-COMBUSTION ENGINES.

1,378,431.  Specification of Letters Patent.  Patented May 17, 1921.

Application filed April 24, 1913, Serial No. 763,467. Renewed August 27, 1919. Serial No. 320,308.

*To all whom it may concern:*

Be it known that I, JOHN S. TAYLOR, a citizen of the United States, residing at Norfolk, in the county of Norfolk and State of Virginia, have invented certain new and useful Improvements in Combined Manifold and Rotary Distributing-Valves for Internal-Combustion Engines, of which the following is a specification.

This invention relates to improvements in combined manifold and rotary valves for internal combustion engines.

The valve about to be described is particularly adapted for use in connection with an engine of the two-cycle type, described and shown in the patent to William F. Stone, Number 1,063,475, wherein the charge is delivered in the base of the cylinder and transferred to an explosion chamber, and exhausted therefrom after the explosion without exhaust valves.

The primary object of the invention is to provide a valve, whose construction enables it to serve as a manifold for all of the cylinders in case of use upon a multiple cylinder engine, and to distribute the charge in proper proportions to all of the cylinders, the construction and location of the rotary valve, being such that it is removed from the combustion portion of the engine, thereby eliminating heat considerations that might affect the operation of the valve, and renders it easily and effectually lubricated.

A further object of the invention is to provide a valve which is always in communication with a carbureter or other source of supply, and which is always filled with gas, ready to be delivered into the intake ports of the cylinders as they are successively opened, and one in which the ports will be gradually opened and closed between the point of greatest area of opening, so that the fullest opening will be effected at a time when the suction force of the pistons are at their greatest, or about midway of their upward stroke, and further, it is my object to provide a valve that can be rotated either at the same, one-half, or one-quarter of the crank shaft speed, thus giving a wide range of engine speed, with low valve speed.

In the drawings illustrating the invention,

Figure 1 is a horizontal sectional view of the valve casing, and carbureter connections in proper relation to a number of cylinders, the valve shell or valve proper being in elevation;

Fig. 2 is a broken detail sectional view of the base of a cylinder, valve and valve casing, taken on line *a—a* of Fig. 1;

Fig. 3 is a vertical section taken on line *b—b* Fig. 1.

Fig. 4 is a section taken on line *c—c* of Fig. 1.

Figs. 5 and 6 are detail sections showing two different positions of the valve, wherein the intake port is closed;

Fig. 7 is a section showing a modified arrangement of ports, in valve shell.

Fig. 8 shows still another modification;

Fig. 9 is a vertical section of the engine cylinder and the crank case complete, partially shown in Figs. 1, 4, etc.

Referring to the drawings, the numerals 1, 2, 3, and 4 designate the engine cylinders, which, in a four cylinder engine, I prefer to arrange as shown, that is to say, the two inner cylinders arranged close together with the end cylinders comparatively remote, for a purpose that will presently be described. The numeral 5 designates the valve casing, which is closed at one end by a suitable plug as indicated at 6.

Preferably cast integral with the valve casing is a supply conduit or pipe 10 communicating with the valve casing through openings 11, said openings being in communication with circumferential chambers 12, the valve casing being provided with circular enlargements 13, said chambers extending entirely around a rotary, tubular valve 14. The valve, at this point, is provided with a suitable number of elongated openings 15, (four in the present instance) and these openings are so extensive that they virtually leave the valve open at these points, so as to at all times, during the rotation of the valve, admit a sufficient and abundant charge into the valve. The valve is provided with ports 16, 17, 18, and 19, adapted to supply the respective cylinders 1, 2, 3 and 4, through ports 20 in the various cylinders.

The numeral 21 designates a suitable carbureter which is attached to the supply conduits 10, which lead to the constantly open ports of the valve shell.

Attached to the valve, at one end thereof, is a gear wheel 22 in mesh with a similar wheel 23, which may be driven directly or indirectly from the engine shaft. In the illustration, Fig. 1, the position of the valve is such that the cylinders 1 and 2 will be in communication with the interior of the valve through the ports 16 and 17, thus acting as a distributer for the charge for these two cylinders, while the solid part of the shell has closed the ports 20, of the cylinders 3, and 4. A rotation of the valve from the position shown will obviously close the ports 16 and 17, between the valve and cylinders 1 and 2, and open the ports 18 and 19 to establish the communication between the interior of the valve and the cylinders 3 and 4, the operation being repeated upon the constant rotation of the valve.

In Fig. 5 is shown a position of the valve 14 with the port closed, or the position the valve would occupy as the piston starts up, the valve rotating in the direction of the arrow, will uncover the port gradually so that when the piston has reached the middle of its upward stroke, the valve would be open to its fullest extent.

Fig. 6 shows the position of the valve when the piston is at top stroke, in which position the port is closed, and will remain closed until the lowermost position of the piston is reached, and for a moment after its start upon its upward stroke.

In Fig. 9 the parts of an engine apparatus such as presented in the patent referred to, namely, 1,063,475, together with my present valve system, are shown.

As heretofore stated, I prefer, in a four cylinder engine, to arrange the cylinders with respect to the valve casing and valve, as shown, that is to say, the two intermediate cylinders close together and the two end cylinders comparatively remote from the intermediate cylinders. This allows for the location midway between the inner and outer cylinders of the chambers in the valve casing, from which the fuel is distributed through the tubular valve to the various cylinders, the distance of travel of the fuel, by this arrangement, being the same for all of the cylinders; that is to say, the distance between the ports of the cylinders and the supply openings from the opposite ends of the conduits, which insures uniform distribution and the delivery of an equal charge to each cylinder.

In the drawings I have shown parts of cylinders such as are more fully illustrated in the aforesaid Stone Patent 1,063,475. In these engines the explosive mixture is initially admitted to the interior of the main cylinder which is traversed by a long hollow piston. Immediately after each charge is drawn in to a cylinder it is received within the hollow piston and slightly compressed, and is then taken immediately by short transfer ports to the explosion chamber.

One of the main objects is to provide an engine apparatus which will be of the utmost simplicity; and when the introducing and cutting off of the mixture is controlled by a valve of the character of that herein shown, all reciprocating valves and their numerous attachments are dispensed with. The piston and pitman are the only reciprocating parts. The valve is actuated with an easy rotary motion and positively supplies charges to the cylinders which are all uniform, the mixture volumes for the charges in the several cylinders all traveling the same distance from the carbureter.

Referring to the modification in Fig. 7, the valve shown is provided with two oppositely disposed ports 24, which ports are of one-half the width of the ports, as shown, in the main figures, which insures the supply for running the valve at one-half engine shaft speed and Fig. 8 shows a construction wherein four ports 25 are provided on the quarter circle, which ports are of one-fourth the width of the ports in the main figures, for running the valve at one-fourth of the speed of the engine shaft.

From the foregoing description, it will be seen that an extremely simple and efficient rotary valve is provided that serves the purpose of a manifold through which the live charge is distributed to the various cylinders, and the construction is one in which the velocity of the incoming charge is maintained "constant" through the entire stroke by reason of the valve opening wider as the suction increases, the valve in the main figures being wide open when the piston is one-half way up and moving at its greatest velocity, and having its greatest suction force and closes gradually, as the limit of the top stroke is reached, which is a highly desirable feature in this type of engine.

The valve 14 is of very simple construction, being a tube freely open from end to end, that is to say, it is not interrupted by partitions, either transverse or longitudinal. This is made possible because, owing to the type of engine in which the valve is used, the flow through the valve is in one direction only—toward the cylinders,— and hence provision does not have to be made for changing the direction of flow through the valve as is the case with those valves that serve to direct both the inflow and outflow of the gaseous fluid they control. By connecting the valve with the lower end of the cylinder and causing the piston therein to be always interposed between the valve and the end of the cylinder in which the explosion takes place, I insure that the valve is never subjected to the shocks that are incident to the burning of the fuel charges; and for this reason, among others, I am enabled to successfully use a simple and relatively light cylindrical valve such as described, without experiencing the difficulties so frequently encountered where rotary cylindrical valves are attempted to be used in internal combustion engines and when connected with the explosion chambers thereof so as to be subjected to the successive violent shocks and pressures that are due to the burning of the separate fuel charges, which forces being oft repeated operate to change the shape of the cylindrical valves so that they cease to accurately fit the casings in which they are mounted, thus destroying their efficiency.

Having thus described my invention, what I claim is:—

1. In an internal combustion engine, the combination with the cylinders in which operate the pistons, the cylinders being closed at their ends opposite those constituting the explosion chambers, and each having an inlet fuel port near the said closed end, of a valve device through which the fuel mixture for the engine passes in one direction only, comprising a casing united with the cylinders and having passages communicating with the said inlet ports to the cylinders, a valve mounted in the said casing and consisting of a tube open from end to end and mounted in the said casing, the tube having outlet ports communicating with the passages to the cylinders and with inlet ports, supply passages communicating with the said inlet ports through which fuel is adapted to enter, and means for turning the valve in its casing.

2. In an internal combustion engine, the combination with the cylinders in which operate the pistons, the cylinders being closed at their ends opposite those constituting the explosion chambers, and each having an inlet fuel port near the said closed end, of a valve device through which the fuel mixture for the engine passes in one direction only, comprising a casing united with the cylinders and having passages communicating with the said inlet ports to the cylinders, and being formed, between the cylinders constituting a pair, with circumferential chambers, a valve mounted in the said casing consisting of a simple tube open from end to end so as to permit free axial flow through it, the said tubular valve having formed in it outlet ports communicating respectively with the passages leading to the cylinders, and inlet ports communicating with the circumferential chambers of the casing, supply conduits delivering to the said circumferential chambers, and means for turning the valve in its casing.

In testimony whereof I affix my signature in presence of two witnesses.

JOHN S. TAYLOR.

Witnesses:
   HALLACK A. PENROSE,
   JAS. T. QUINLAN.